July 14, 1959 — C. D. PAWLICKI — 2,894,359
METHOD OF APPLYING SEALING COMPOSITIONS TO GLASS PARTS
Filed Aug. 9, 1955 — 2 Sheets-Sheet 1
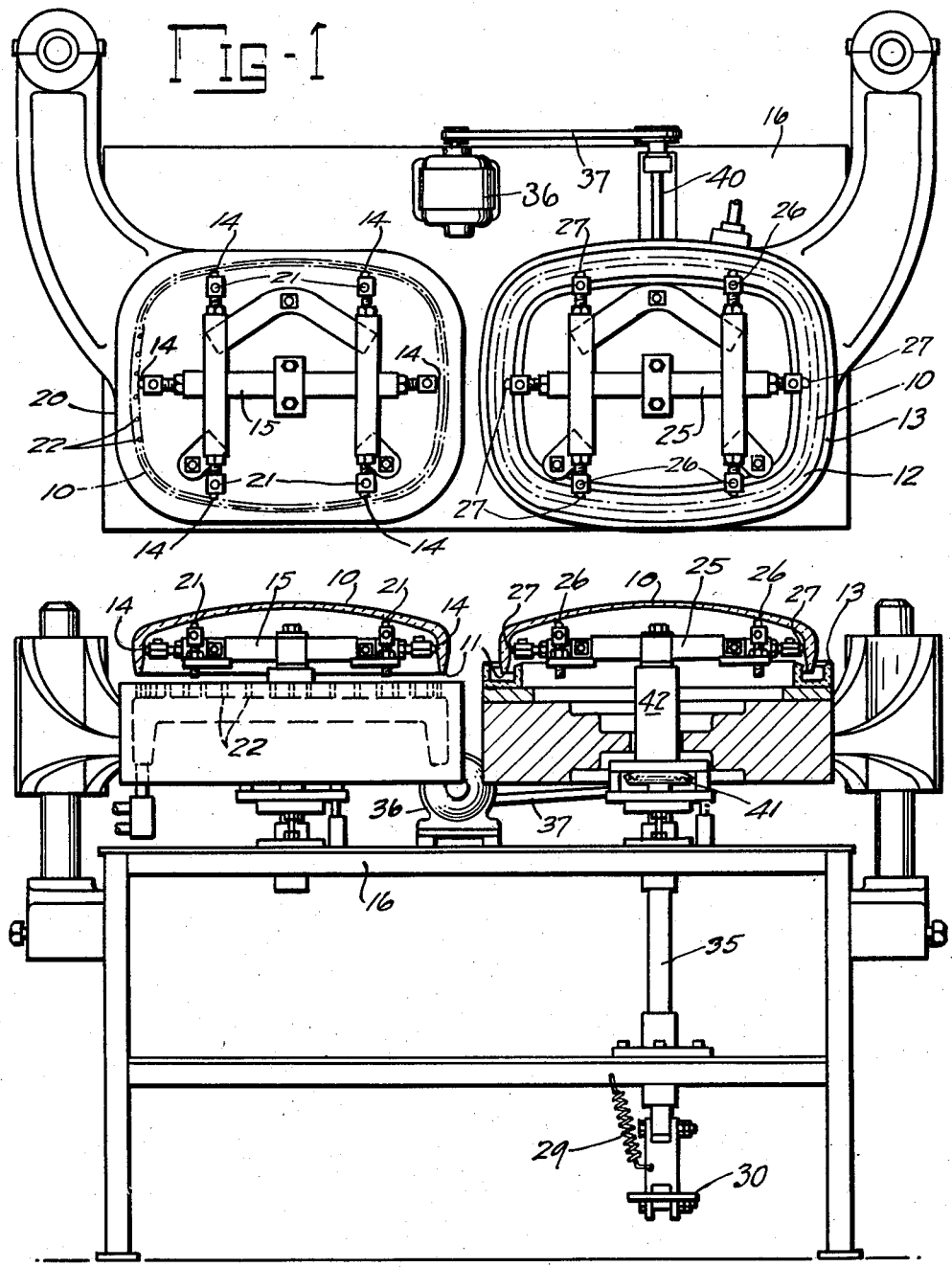
INVENTOR.
CLARENCE D. PAWLICKI July 14, 1959  C. D. PAWLICKI  2,894,359
METHOD OF APPLYING SEALING COMPOSITIONS TO GLASS PARTS
Filed Aug. 9, 1955  2 Sheets-Sheet 2

INVENTOR.
CLARENCE D. PAWLICKI
BY W. A. Schaich
Leonard A. Doubie
ATTORNEYS

2,894,359

METHOD OF APPLYING SEALING COMPOSITIONS TO GLASS PARTS

Clarence D. Pawlicki, Toledo, Ohio, assignor to Owens-Illinois Glass Company, a corporation of Ohio Application August 9, 1955, Serial No. 527,258

4 Claims. (Cl. 49—82)

This invention relates to methods of joining glass to glass or glass to metal, and more specifically to an improved method of applying low melting bonding or sealing compositions to higher melting glass or metal parts to facilitate their subsequent assembly into composite units. The sealing compositions consist primarily of low melting, glass-like compositions for the brazing or welding of shaped glass or metal parts at lower temperatures into articles composed of similar or dissimilar materials, such compositions being disclosed in the copending application, Serial No. 481,008, filed January 10, 1955, now abandoned.

This method provides a novel means of coating the edges of parts to be united by low melting compositions at temperatures which will not affect the individually shaped parts but which will permit chemically uniting such parts. The method is particularly valuable in the fabrication of composite glass articles, such as cathode raytubes, where the use of high temperatures must be avoided to prevent damage to both the glass parts and the working parts within the tubes.

The bonding compositions employed herein are materials which have low melting temperatures in relation to the melting temperatures of the materials to be joined. The fiber softening points of the compositions reside within a temperature range of from 600 to 850° F. while the higher melting materials have annealing temperatures considerably in excess of this range. The compositions also have certain chemical and physical properties compatible with the similar properties of the higher melting materials and are therefore able to chemically and permanently unite the same. Other properties of the compositions are the indices of thermal contraction which are in a range of suitable agreement with those of the joined materials to produce virtually stress-free or stress-controlled joints and sufficient chemical durability and resistance to devitrification to form permanent hermetic seals.

The present invention eliminates the problems inherent in the uniform application of low melting bonding compositions to glass or metal surfaces at atmospheric temperatures. Usually the selected composition is first pulverized and suspended in a suitable carrier, being placed on the desired surfaces to be joined in pulverized form to obtain even distribution of the composition. In such applications the carrier is usually eliminated before the said composition is heated and softened to bond the coated edge surfaces in the fabrication of component parts.

The principal object of this invention is to provide an economical and improved method for the uniform application of a low melting glass brazing composition to sealing or joining edge portions of shaped individual parts composed of higher melting materials to facilitate their subsequent fabrication.

A further object is the control of temperatures of the parts and composition in the present method in order that the amount of bonding composition applied to the joining surfaces can be controlled and regulated to provide the optimum amount of bonding agent for assembly of one or more parts having such coated edge surfaces.

A still further object is to provide such coated parts for joining either at the time of coating or at some subsequent time.

The specific nature of this invention as well as other objects and advantages thereof will become apparent to those skilled in the art from the following detailed description.

On the accompanying drawings:

Fig. 1 is a plan view of a mechanism for carrying out the method;

Fig. 2 is a part sectional front elevational view of the machine;

Figure 3:
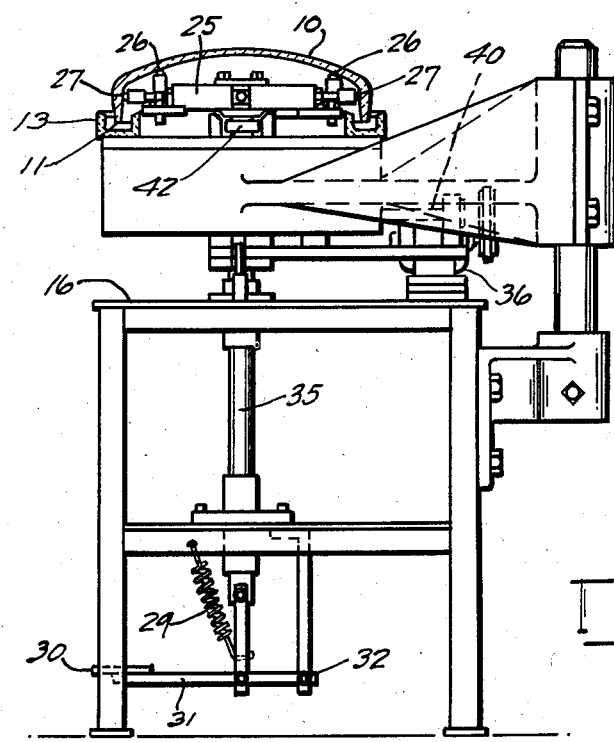
Fig. 3 is an end view of the machine.
Figure 4:
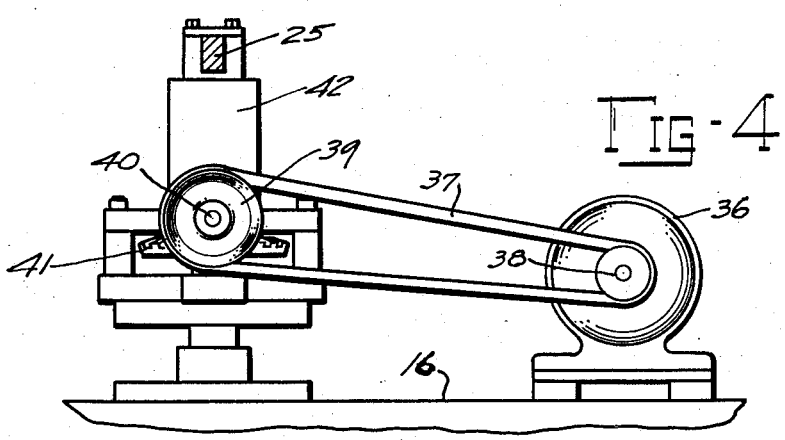
Fig. 4 is a view of the driving mechanism.

The illustrated embodiment of this invention shows one application of the method for placing a low melting, glass-like composition on the plane open sealing or joining edge of a hard glass face plate of a cathode ray tube. To this edge is attached a glass funnel (not shown) which may or may not be similarly coated to permanently bond the parts together. Such glass parts have been successfully bonded at their mating edges by coating either one or both of the joined edges. The method may be applied to joining glass to glass or glass to metal by proper selection of the low melting composition employed.

The hard glass part which is to be coated on one edge by the selected composition is a cathode ray face plate 10 as shown in Fig. 2. The edge 11 to be coated may be ground, fire polished or otherwise flattened to obtain a relatively flat surface for coating and sealing. The glass face plate with its flattened open edge may then be entirely preheated to a temperature either below or near its annealing temperature but in every case to a temperature below its deformation temperature and the edge portion to be coated may be preheated above its annealing temperature or to a higher temperature than the body of the face plate in order to improve or control the adherence of the coating. This preheating of the part relieves stresses which are usually present at atmospheric temperatures, and more importantly, prevents chipping or fracturing of the part due to thermal shock in the following immersing operation. The rate of heating in this operation is controlled to the extent that breakage of the part is not experienced. The heating rate is normally limited to less than 20° F. per minute in the case of a large cathode ray face plate, but can be and is varied depending on the nature of the part to be edge coated.

The bonding composition 12 usually in the form of broken, irregularly-shaped pieces is melted in an annular trough 13 which conforms to the size and shape of the edge to be coated. As shown in Fig. 1 the trough is a continuous shallow gutter, which is rectangular or U-shaped in cross section, and which is sufficiently wide and deep to accommodate the edge 11 of a glass part and the molten composition 12. The trough is fabricated of a material such as platinum to prevent contamination of the low melting composition in the molten state and to permit heating by various means such as a gaseous flame or electrical energy to completely melt the composition therein and to maintain it at a constant and desirable working temperature.

These coating compositions consist essentially of lead oxide (PbO) and boric oxide ($B_2O_3$) with lesser amounts of zinc oxide (ZnO) and copper oxide (CuO) comprising less than 20 percent of the combined proportions. Lead oxide (PbO) may in most instances be the major constituent of the compositions which have satisfactory contraction coefficients for joining prefabricated hard glass parts. The usual working or coating temperatures of the compositions as provided in the trough 13 lie within the range of 900 to 2000° F. with approximately 1600° F. being the preferable temperature for obtaining a satisfactory coating. This temperature may be varied higher or lower with respect to the temperature of the part to be coated depending upon the individual properties of the composition employed and whether a greater or lesser adherence of coating along the sealing edge is desired. A sufficient amount of the composition 12 is melted within the trough 13 to fill the same to a given level which will not overflow by displacement when the glass edge 11 is placed therein. The edge surface is coated to a predetermined height determined by the depth to which the edge portion is immersed in the molten material. New material is fed into the trough by any well-known means in order to maintain a suitable working level of the molten composition.

The preheated face plate 10 is positioned on a locating holder 15 mounted on a table 16. This holder 15 is comprised of contacts 14, which locate the face plate 10 vertically with respect to the top surface of burner 20 mounted on table 16. Contacts 21 locate the face plate 10 horizontally to bring the sealing edge 11 into alignment with the burner openings 22 of the burner 20. With the face plate 10 so positioned the flames from openings 22 impinge upon the sealing surface or edge 10 and establish a temperature gradient in the glass part from said surface or edge toward the body thereof and causing a fusion between said edge and the subsequently applied sealing composition.

When edge 11 has been preheated to the desired temperature, the face plate is transferred to the holder 25 mounted on table 16 and to one side of holder 15. The face plate 10 is positioned on the vertical contacts 26 and horizontal locating points 27 to locate the edge 11 with respect to the trough 13. The pedal 30 is actuated to swing arm 31 about the horizontal axis 32 to shift shaft 35 vertically downward and move the holder 25 therewith to dip edge 11 of face plate 10 into the sealing composition 12 in trough 13.

Actuation of pedal 30 automatically starts the motor 36 which through belt 37, pulleys 38 and 39 drives shaft 40. A gear train 41 drives a gimbal-type structure or rocking assembly 42 which supports holder 25 and causes the edge 11 of face plate 10 to have a non-rotating but progressive rocking or gyratory motion about the vertical centerline of shaft assembly 42. A more detailed description of this rocking mechanism may be obtained by reference to a copending application Ser. No. 530,329, filed August 24, 1955 of common ownership and assignee, now Patent No. 2,822,777, which issued February 11, 1958.

The planular or joining edge 11 of the heated glass part 10 is dipped to a definite depth into the molten composition which is maintained at its working temperature. The complete edge is not normally dipped straight into the molten composition, but is dipped with a progressive rolling or gyratory motion and while held angularly to the surface of the composition starting at one point on the edge and proceeding along and through the lineal length of the peripheral edge until all portions thereof have been coated. The angle between the edge and the surface of the composition is purposely kept small during this operation, particularly at the start of the coating movement in order to prevent the formation of bubbles between the edge and the coating composition. Fewer bubbles are formed in the material which adheres to the parent glass edge and better adhesion is obtained by the use of such angular dipping.

The edge 11 is dipped progressively and angularly with only a small portion of the edge surface immersed at one time by constantly gyrating the part about an angularly disposed fulcrum until the complete edge is coated. Normally one revolution of the part with the edge 11 progressively positioned within the composition 12 will provide a satisfactory coating of the desired thickness. Because of the fact that only small portions of the edge are brought into contact with the molten composition and the further fact that the body or mass of composition is so small or limited, the part being immersed is subjected to only a minimum increase in temperature. The immersion movement of the edge portion is kept at a uniform rate of speed during the coating operation, the rate being dependent on the viscosity of the molten composition and the temperature of the glass part. For example, a single revolution is sufficient to coat the rectangular shaped edge of a 21 inch tube face plate or when the revolving immersion is conducted slowly covering a period of 15 seconds and with the composition at a temperature of approximately 1600° F. However, more than one revolution may be utilized under certain circumstances.

After one or more revolutions with the edge portions progressively positioned in the molten composition, the constant angular rotation is continued to the point where the last portion of the edge is withdrawn from contact with the molten composition.

With the end of the dipping, the pressure upon pedal 30 is released, the motor 30 ceases operation, and spring 29 causes the holder 25 to move vertically upward withdrawing the edge 11 from contact with the composition 12. A uniform and bubble free coating remains adherent to the edge 11 with only a string of separation between the part and the composition being formed at the point of separation of said edge and composition. This string immediately parts and retracts quickly to the edge surface and is thus not objectionable on the coated surface. Contact between the parent glass edge 11 and the trough 13 is avoided during the dipping operation to prevent any sticking of the edge to the trough. The tendency of hard glass to stick to the heated platinum trough at the working temperature of the composition must be avoided to maintain continuity of rotation and uniform adherence of the composition to the coated edge.

By proper temperature control the viscosity of the molten composition is controlled so that it will wet and adhere to the preheated glass edge. By thus controlling the viscosity of the composition and the temperature of the preheated part, the amount of composition which will adhere and chemically unite with the sealing edge may be regulated. With the composition at a higher temperature in a more fluid condition, a lesser amount of the composition will adhere to the edge. With the composition at a lower temperature in a more viscous condition, a greater amount of the composition will adhere due to increased cohesiveness of the composition. Thus, variable thicknesses of the composition may be chemically bonded to the coated edge, depending entirely upon proper temperature control of the molten composition as well as that of the preheated part and the number of times the edge is immersed in the composition.

The glass part may immediately after immersion be sealed to the mating edge of another preheated part which may or may not be similarly coated. The joined parts may be annealed with firm adherence of the coating to each of the joined surfaces thereby uniting the same. The fabricated article is cooled at a controlled rate to avoid breakage thereof. If the part is not to be bonded immediately to another part, it may be annealed and cooled for later sealing to another part composed of similar or dissimilar material.

By the use of a trough having a U-shaped cross section contoured to the shape of the sealing edge of the part to be coated, a smaller amount of the molten composition is employed and its viscosity may be more easily and closely controlled with considerable reduction in heat and volatile loss. Other advantages are that excessive heating of the body of the glass part is avoided and damaging oxidation of internal working members which may be contained within the glass part is also prevented.

Because of the great difference between the melting points of the sealing composition and the hard glass part, the coating operation will not disturb the shape or contour of the glass part, the complete application of the composition being made at a temperature below the deformation temperature of the glass body but at a temperature conducive to the chemical bonding and uniting of the glass and composition. No detrimental change in the overall annealed characteristics of a glass part is experienced. Similarly, no warpage or distortion of the part occurs because the composition is applied at a sufficiently low temperature. The method may be used with equal facility to coat the edge surfaces of either glass or metal parts for fabricating a plurality of parts composed of like or unlike materials.

The term "hard" glass as used above is defined to mean previously molded or formed glass which constitutes rigid parts or articles.

Various modifications may be resorted to within the spirit and scope of the appended claims.

I claim:

1. The method of joining a low melting glass sealing composition to the open edge of a hollow article composed of a higher melting material, said method comprising the steps of preheating said article at a controlled rate to a temperature below its deformation temperature, maintaining said low melting composition in a molten condition, and immersing successive localized increments of said open edge progressively in said molten composition, the immersion being effected by imparting a gyratory motion to the article.

2. The method of preparing a shaped hard hollow glass part for joining with another glass part, said part having an open edge portion defining a sealing surface, said method comprising the steps of flattening said sealing surface, preheating said sealing surface at a controlled rate and to a temperature near its annealing temperature, providing a low melting sealing composition in molten condition, maintaining said composition at a constant temperature not in excess of approximately 2000° F., the exposed portion of the surface of said molten composition having the same peripheral contour as said sealing surface, immersing successive localized increments of said open edge progressively in said molten composition, the immersion being effected by imparting a gyratory motion to the article, and annealing and cooling the said shaped hard glass part.

3. The method of joining a low melting glass sealing composition to an open edge of a shaped hollow glass article having a higher melting point than said sealing composition comprising the steps of preheating said article to a temperature less than its deformation temperature, heating said low melting composition to a temperature of approximately 1600° F. and maintaining said last-mentioned temperature constant, and immersing successive localized increments of said open edge progressively in said heated composition, the immersion being effected by imparting a gyratory motion to the article.

4. The method of preparing a shaped hollow hard glass part for joining with another glass part, said part having an open edge portion defining a sealing surface, said method including the steps of preheating said sealing surface at a controlled rate to establish a fusion temperature in and along said surface, providing a low melting sealing composition in molten condition and at a temperature of approximately 1600° F., the exposed portion of the surface of said molten composition having the same peripheral contour as said sealing surface, immersing successive localized increments of said open edge progressively in said molten composition, the immersion being effected by imparting a gyratory motion to the article, discontinuing said immersing and allowing said composition to cool and chemically bond to the said surface, and annealing and cooling the said coated glass part.

References Cited in the file of this patent

UNITED STATES PATENTS

| | | |
|---|---|---|
| 1,554,703 | Berry | Sept. 22, 1925 |
| 2,034,987 | Morita | Mar. 24, 1936 |
| 2,068,250 | Thomas | Jan. 19, 1937 |
| 2,105,174 | Zimmerman et al. | Jan. 11, 1938 |
| 2,109,258 | Slayter | Feb. 22, 1938 |
| 2,145,351 | Hazelton | Jan. 31, 1939 |
| 2,149,246 | Zimmerman et al. | Feb. 28, 1939 |
| 2,164,093 | Soubier | June 27, 1939 |
| 2,179,317 | Barnard | Nov. 7, 1939 |
| 2,304,714 | Stringer | Dec. 8, 1942 |
| 2,434,555 | Fischer et al. | Jan. 13, 1948 |
| 2,643,020 | Dalton | June 23, 1953 |

FOREIGN PATENTS

| | | |
|---|---|---|
| 656,805 | Great Britain | Sept. 5, 1951 |